US009456688B2

(12) United States Patent
Moyer

(10) Patent No.: US 9,456,688 B2
(45) Date of Patent: Oct. 4, 2016

(54) MODULAR STORAGE AND WORK STATION

(71) Applicant: HMC Holdings, LLC, Wampum, PA (US)

(72) Inventor: David A. Moyer, New Castle, PA (US)

(73) Assignee: KMC Holdings, LLC, Wampum, PA (US)

(*) Notice: Subject to any disclaimer, the term of this patent is extended or adjusted under 35 U.S.C. 154(b) by 0 days.

(21) Appl. No.: 14/872,683

(22) Filed: Oct. 1, 2015

(65) Prior Publication Data
US 2016/0095430 A1  Apr. 7, 2016

Related U.S. Application Data

(60) Provisional application No. 62/058,495, filed on Oct. 1, 2014.

(51) Int. Cl.
A47G 29/00 (2006.01)
A47B 47/00 (2006.01)
A47B 87/00 (2006.01)
A47B 87/02 (2006.01)
F16B 12/10 (2006.01)

(52) U.S. Cl.
CPC ......... A47B 47/0091 (2013.01); A47B 87/008 (2013.01); A47B 87/0276 (2013.01); F16B 12/10 (2013.01); F16B 2012/103 (2013.01); F16B 2012/106 (2013.01)

(58) Field of Classification Search
CPC ............ A47B 87/008; A47B 87/0276; A47B 47/0091; F16B 2012/103; F16B 2012/106; F16B 12/10
USPC ...................................... 312/111; 108/64, 91
See application file for complete search history.

(56) References Cited

U.S. PATENT DOCUMENTS

| 1,340,562 | A | * | 5/1920 | Sandmann | A47B 87/02 |
| | | | | | 312/108 |
| 2,912,294 | A | * | 11/1959 | Wells | A47B 87/02 |
| | | | | | 312/111 |
| 3,107,131 | A | * | 10/1963 | Lightburn | A47B 87/02 |
| | | | | | 206/509 |
| 3,272,582 | A | * | 9/1966 | Mack | A47B 47/0008 |
| | | | | | 108/59 |
| 3,465,898 | A | * | 9/1969 | Klein | A47B 87/0215 |
| | | | | | 108/91 |
| 3,636,893 | A | * | 1/1972 | Lange | A47B 47/0091 |
| | | | | | 108/101 |
| 3,786,765 | A | * | 1/1974 | Burr | A47B 39/00 |
| | | | | | 108/60 |
| 4,934,858 | A | * | 6/1990 | Beaulieu | F16B 12/40 |
| | | | | | 211/192 |
| 5,048,995 | A | * | 9/1991 | Beaulieu | F16B 7/0473 |
| | | | | | 403/174 |
| 5,345,737 | A | * | 9/1994 | Latchinian | A47B 57/565 |
| | | | | | 403/172 |
| 5,466,057 | A | * | 11/1995 | Blankenburg | A47B 87/005 |
| | | | | | 312/108 |
| 5,715,760 | A | * | 2/1998 | Frascaroli | A47B 13/023 |
| | | | | | 108/180 |
| 6,152,553 | A | * | 11/2000 | Wunderlich | A47B 47/0091 |
| | | | | | 108/110 |
| 6,250,025 | B1 | * | 6/2001 | Darby | E04H 13/006 |
| | | | | | 52/137 |
| 2008/0129160 | A1 | * | 6/2008 | Fleckenstein | A47B 31/00 |
| | | | | | 312/111 |
| 2009/0021122 | A1 | * | 1/2009 | Green | A47B 47/0091 |
| | | | | | 312/107 |
| 2010/0090567 | A1 | * | 4/2010 | Felice | A47B 47/022 |
| | | | | | 312/107 |
| 2010/0176697 | A1 | * | 7/2010 | Fuerstenau | A47B 87/008 |
| | | | | | 312/198 |
| 2015/0060321 | A1 | * | 3/2015 | Wang | B65D 21/0204 |
| | | | | | 206/512 |

FOREIGN PATENT DOCUMENTS

GB   2176995 A   *  1/1987   ............. A47B 57/14

* cited by examiner

Primary Examiner — Hanh V Tran
(74) Attorney, Agent, or Firm — Vangelis Economou; Economou IP Law

(57) ABSTRACT

A modular storage of modular storage units defined by plural hollow elongate support members having longitudinal ends including apertures into which vertical connection members can be inserted to connect adjacent modules. The inserts may be of a predetermined length to connect two horizontally adjacent modules or a length twice the predetermined length to connect two horizontally adjacent modules. For vertically and horizontally connected modules, double-headed dowel pins can be inserted in a U-shaped channel of the connection members that rigidly and securely retain the modules connected to each other so as to enable the configuration to present a stable work surface. A second type of connection member can be used to provide for an end connection at a top or bottom of the configuration, enabling a hook to hold onto the adjacent hollow tubular member and/or to provide for insertion of a caster.

9 Claims, 12 Drawing Sheets

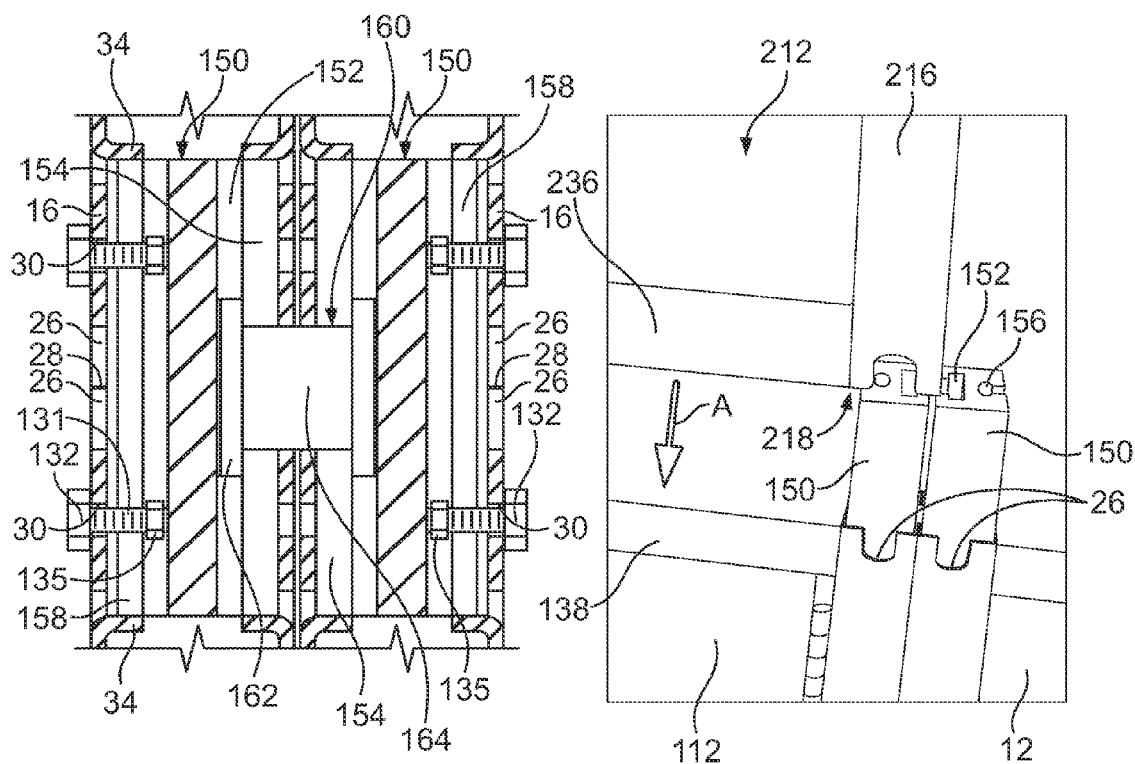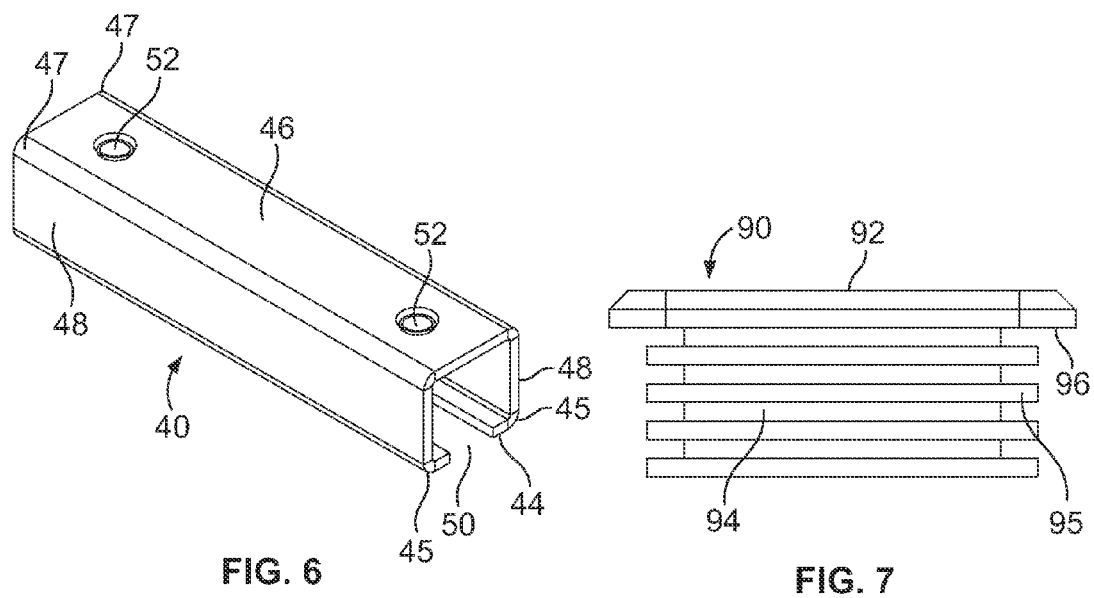

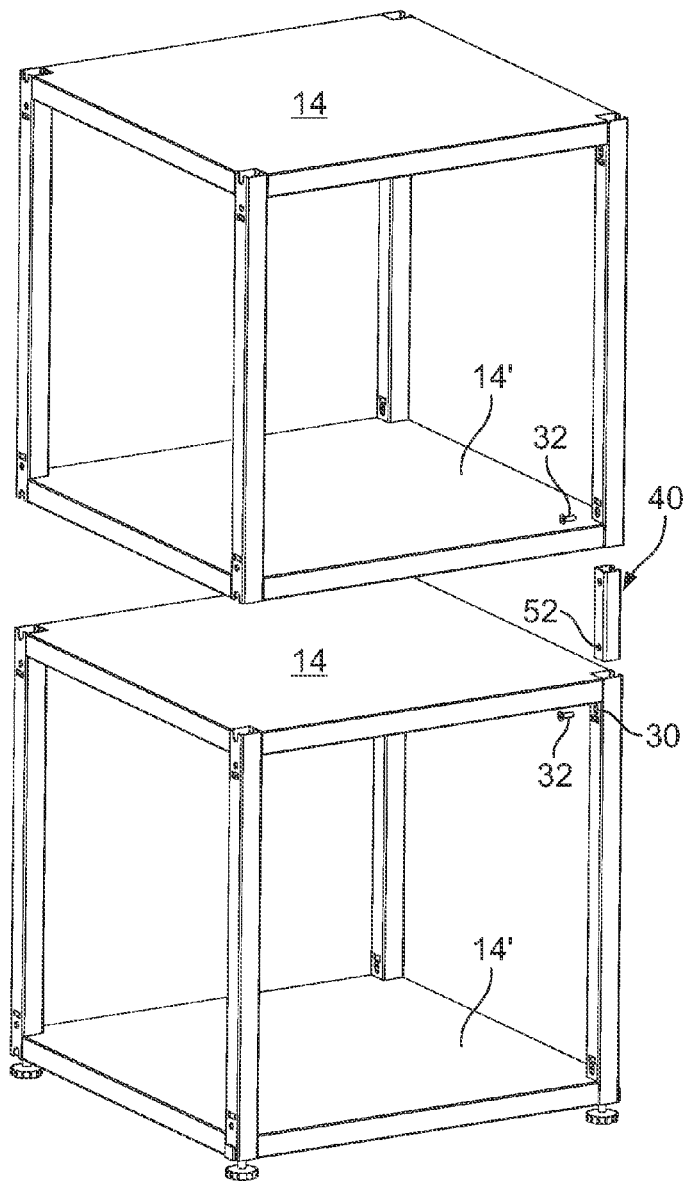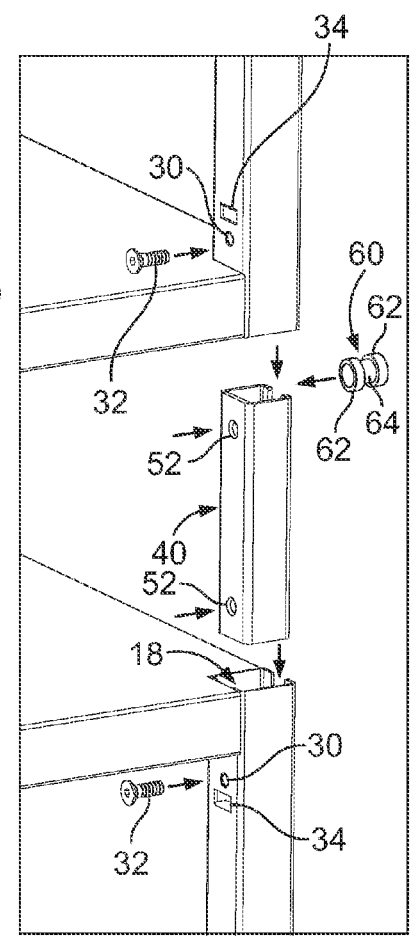
FIG. 12
FIG. 12A

MODULAR STORAGE AND WORK STATION

CROSS REFERENCE TO RELATED APPLICATIONS

This is a non-provisional of U.S. Provisional Patent Application Ser. No. 62/058,495, filed Oct. 1, 2015, the entire specification of which is incorporated by reference herein as if fully set forth.

BACKGROUND OF THE INVENTION

1. Field of the Invention

This invention relates generally to a shelving storage system and more specifically to an arrangement of modular elements that can be used to stack or combine modules to provide modular storage and working spaces that can be easily and efficiently reconfigured.

2. Background Art

Various types of modular storage systems and arrangements have been disclosed or are commercially available. Such modular storage systems generally may include modular wall band systems with support rails mounted onto a wall or other structure and having replaceable shelves positioned on support brackets. For example, see U.S. Pat. Nos. 1,076,116; 2,752,215; 3,178,245; 5,588,540; 6,578,937; 7,866,769; 8,418,874, 8,584,873. While these are all drawn to modular storage systems, they lack rigidity and flexibility and the ability to quickly and sturdily reconfigure a specified configuration desired by the user, or to have a flexible system whereby the storage modules may take any of a number of different configurations.

Other types of freestanding modular storage systems are known. These freestanding systems generally use some sort of corner locking mechanisms to maintain each shelf in place. These corner locking mechanisms, however, tend to be somewhat complicated such that the shelves may not be easily reconfigured. For example, U.S. Pat. Nos. 8,573,716 and 8,708,433 each include corner tongue and groove connections that overly complicate the connection and disconnection process, and because of the construction materials and design, are considered unable to withstand continuous and frequent use in rough environments.

In addition, several patents not drawn to storage or shelving units provide unique methods of attaching modular units to each other. For example, U.S. Pat. No. 5,352,017 utilizes a pin and slot structure for temporarily attaching modular pieces of furniture to each other.

None of the heretofore known structures and methods teach the inventive easy to use, easy to connect and disconnect, robust, simple, yet elegant, easily reconfigured construction which can provide for a large number of configurations of varying heights, shapes, surfaces and design appearance.

SUMMARY OF THE INVENTION

Accordingly, there is provided herein a modular storage system comprises a plurality of modular storage units each comprising opposing lateral sides providing for a horizontally oriented length therebetween, the modular storage units each extending between plural hollow elongate support members, the plural hollow elongate support members having longitudinal ends, each of the longitudinal ends including apertures defined by an outer rim disposed thereat, each of the longitudinal end apertures further comprising an internal space extending into the hollow elongate supports, the outer rim of each elongate end having at least one indentation cutout for receiving a double-headed dowel, a predetermined series of the plural hollow elongate support members defining a storage module, a plurality of double-headed dowels having a central dowel pin shaped and configured to fit within the cutout disposed at the outer rim of the longitudinal end apertures so as to enable connection in a horizontal orientation of adjacent elongate support members from different storage modules, and two heads disposed at opposite longitudinal ends of the plural dowel pins the lateral dimensions of the heads being larger than the lateral dimensions of the dowel pins; and a plurality of vertical connection members shaped, dimensioned and configured for at least partial insertion into the longitudinal end aperture of at least one vertically oriented hollow elongate support member so as to maintain the orientation and configuration of support members in two adjacent different modules having vertical alignment; each said vertical connection member including a securing member to secure the vertical connection member to the hollow elongate support members.

In another aspect of the invention, the modular construction provides for a method of assembly and disassembly that is unique, easy and can be performed by at a purchaser's home with a minimum of tooling.

The present application thus provides a modular storage and work surface station and a method and system for modular assembly of different sized and configured modules that are robustly retained and connected to each other. The modular storage and work surface includes a number of support members and shelves. The modules have interlocking corners and plural support and connection members providing for modular construction and ease in reconfiguration of storage modules and work surfaces.

BRIEF DESCRIPTION OF THE DRAWINGS

The present invention will now be discussed in further detail below with reference to the accompanying figures in which:

FIG. 4A is a cross-sectional view of the connections between two horizontal adjacent shelf modules showing the alternate connector inserts taken approximately along lines 3A-3A of FIG. 4;

FIG. 5 illustrates in a perspective detail view of two attached adjacent shelf modules and the insertion of a third module to insert the connector at a corner between vertically aligned modules;

FIG. 6 is a perspective view of the first embodiment of the connector insert;

FIG. 7 is an elevational view of a stopper element;

FIG. 12 illustrates a first embodiment of the invention in a perspective view showing a simple two module shelf configuration with vertically aligned modular units;

FIG. 12A is a detail perspective exploded view of a corner of two vertically aligned shelf modules of the invention showing the connector insert and other elements for connecting therebetween;

DETAILED DESCRIPTION OF THE PREFERRED EMBODIMENTS

Figure 1:
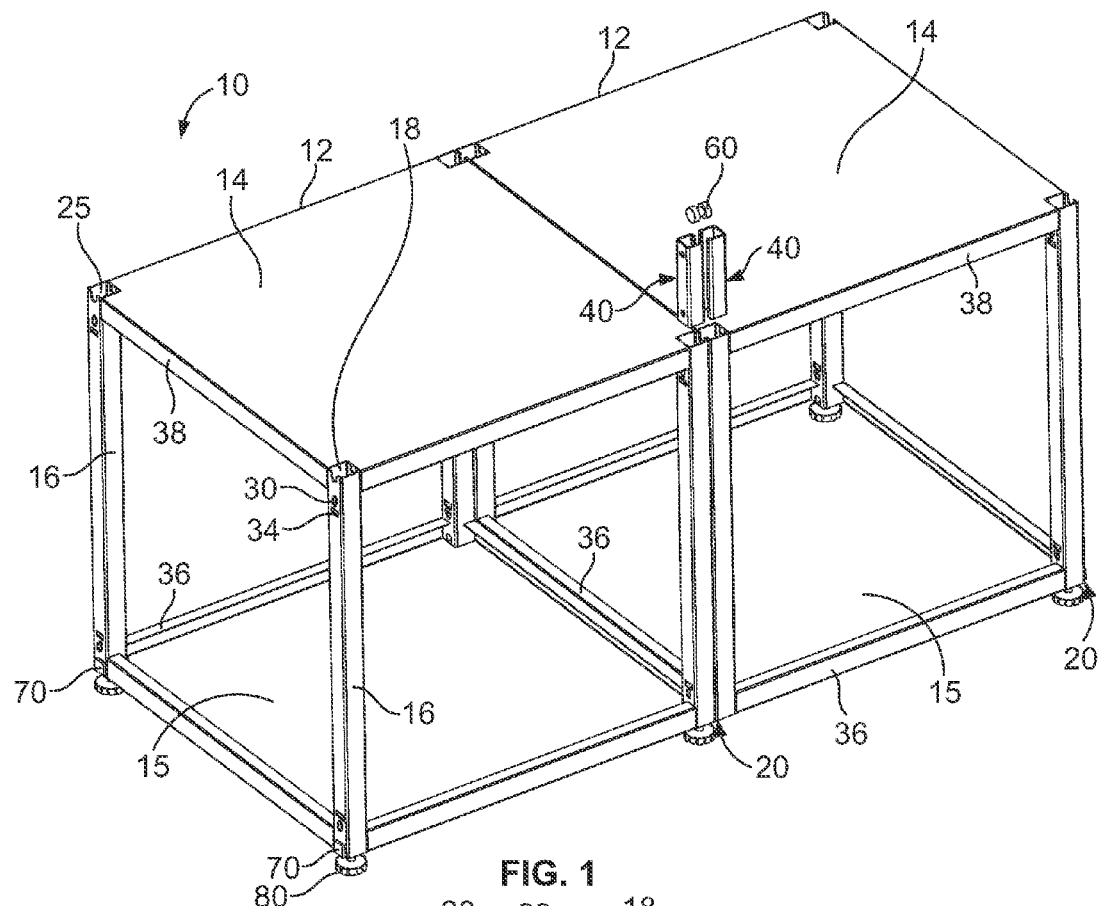
FIG. 1 illustrates a first embodiment of the invention in a perspective view showing a simple two module shelf configuration.
Figure 2:
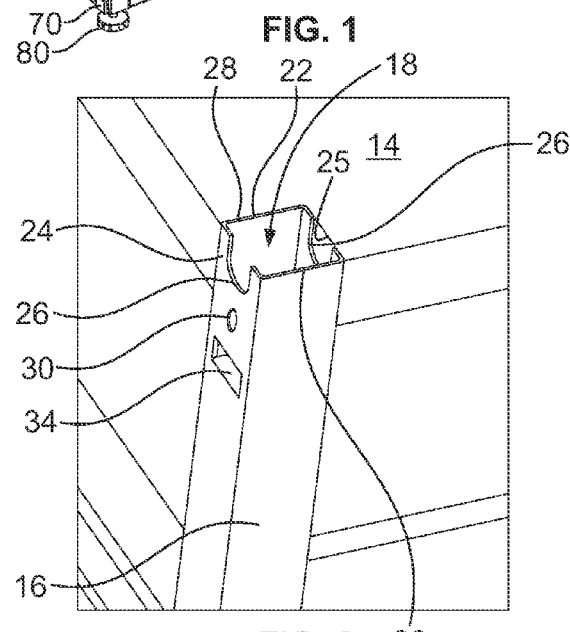
FIG. 2 is a perspective detail view of a corner structure of the first embodiment of the invention shown in FIG. 1.

Referring now to FIGS. 1 and 2, a first embodiment of the invention is shown having a simple configuration 10 comprising two side by side, horizontally oriented shelving modules 12 according to the present invention. Each module 12 comprises standard shelving elements and one shelving module 12 will be described in detail, with the understanding that other modules or units 12 are similar or identical unless otherwise described or illustrated.

Shelving modules or units 12 are in the shape of a cube or rectangular shaped object defining a volume enclosed by at least one quadrilateral shelf surface 14 generally bounded by vertical posts 16 which are in most respects identical to each other. In a first embodiment, shown in FIGS. 1 and 2, and other figures, posts 16 comprise tubular structures, made of a suitable metal, such as steel or stainless steel, that define the four vertical corners of each volume of the cube of the module 12. As shown most clearly in FIG. 2, the end of the post 16 which is uppermost when the modules 12 are deployed on a floor, that is, end 18, is open. Similarly, although not shown, the opposite end 20 is also open. These open ends 18, 20 are each able to receive within the tubular enclosures one of a number of inserts which will be discussed below in greater detail.

The length of tubular channels or posts 16 and spacing between them may be standard height and distance, depending on the desired dimensions of the volume of the cubic space that is required by the specific use. In the embodiment shown in FIG. 1, the length may be 18 inches to about 24 inches, but the length is not a critical part of the invention.

As shown in FIG. 2, the open end 18 and the closed end 20, shown in FIG. 1 have outer rims 22 in the general shape of a square on two opposing sides 24, and a cutout 26 on the other two opposing sides facing away from the front face which would normally be visible to the user. That is, the left facing profile, as shown in FIG. 1, includes an edge 28 of outer rim 22 which is a straight side and the opposing edge 28 has the same straight side, parallel thereto. The corners of the shelf surface 14 also include a square cutout 25 to accommodate the disposition of the ends of posts 16 which extend up to the level of surface 14.

On the edge of sides 24 below the cutout 26 at some distance is a screwhole 30 for insertion of a screw 32 (FIGS. 12 and 12A) to connect the posts 16 to other elements of the module 12. Adjacent to, and further from, the nearest cutout 26 than screwhole 30 is a tongue 34, which is formed by punching a three sided throughcut into the side of tubular channel 16 which includes the screwhole 30, and then bending a free end made by the throughcut about the fourth side so that the tongue 34 extends into the volume defined by walls of channel 16. This is best seen in the cross-section view of FIG. 17.

As can be seen in FIG. 1, the bottommost end of the posts 16 also include the screwhole 28 and tongue 34, but in keeping with the construction, the screwhole 28 is closest to rim 22 at the lower end of post 16. Shown in FIG. 1 is a floor caster 80, which is described in greater detail below in reference to FIGS. 8 and 9 that is connected to an end connection insert 70 (FIGS. 8 and 9) closes of the closed end 20 of the posts 16.

Spanning in the horizontal direction between adjacent posts 16 are lower horizontal struts 36 and upper horizontal struts 38. As shown in FIG. 1, lower horizontal struts 36 span between and connect the lower ends of adjacent posts 16 to each other and the upper horizontal struts 38 span between and connect the upper ends of adjacent posts 16 to each other. As shown in FIG. 1, the upper struts 38 further comprise the perimeter of quadrilateral shelf surface 14. That is, the upper struts 38 are formed by bending twice to form U-shaped construction at the perimeters of the shelf surface 14, and thus struts 38 and shelf surface 14 can be integral. As is shown, orientation of the shelf surfaces 14 are disposed in the modules 12 with the surfaces 14 being above the upper struts 38 adjacent upper ends of posts 16.

The lower horizontal struts 36 adjacent the lower end of posts 16 are shown as not having a surface 14 with the lower struts 36 simply providing lateral supports to the posts 16 defining an open space 15. This type of configuration defines one embodiment and forms a level work surface on shelf surface 14 attached to upper struts 38 above the modules 12. As configured in this embodiment, no shelf surface 14 is providing below at the lower level of the module 12 thereby defining an open space 15. Ideally, for providing shelf storage, it would be preferable to have a similar surface 14 also adjacent the lower end of the posts 16, as is shown in the alternative embodiment configuration in FIG. 12. Alternatively, and as a shelf for storage of liquids, the bottom quadrilateral shelf surface 14 may have a lip (not shown) formed by the lower struts 36 upturned in an upside down configuration enabling such surface to contain spilled liquid within the area of surface. In such a configuration (not shown) it is necessary to provide the shelf surface 14 below struts 36, with the struts 36 extending above shelf surface 14 to provide a barrier and thereby to contain spills.

Also shown in a displaced or partially exploded view of FIG. 1 are disposed two connection inserts 40 and a double headed connecting dowel 50, the structure and operation of which elements will be described in greater detail below with reference to FIGS. 6, 12 and 12A. These elements are used to connect both the horizontally adjacent modules 12. In another alternative configuration shown in FIG. 15 only vertically adjacent modules 12 are connected to each other.

Figure 3:
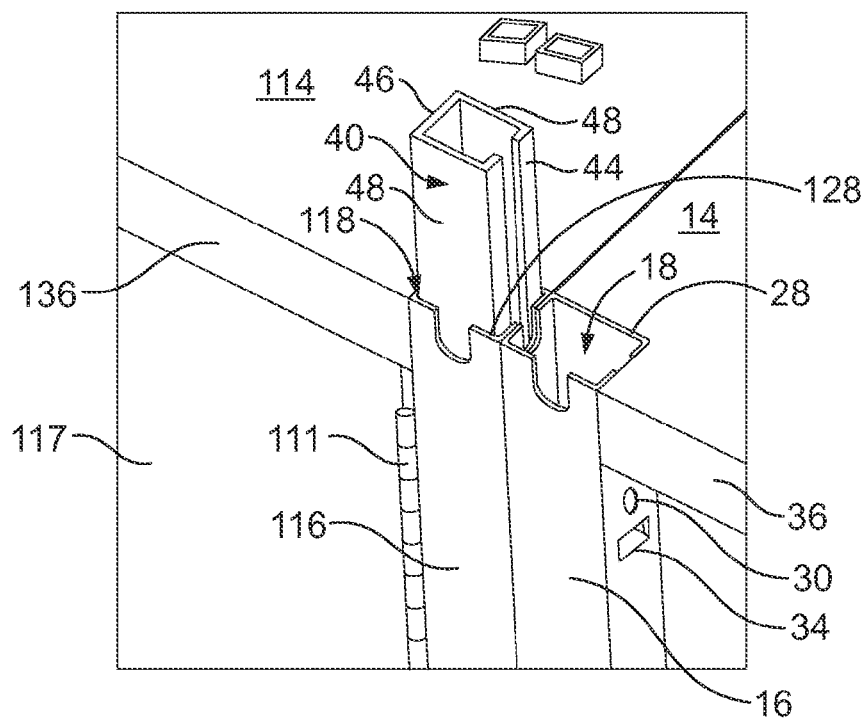
FIG. 3 is a perspective detail of a corner structure of a second embodiment of the invention having an alternate insert connector between two adjacent shelf modules.

Referring now to FIG. 3, a connection insert 40 is shown that is inserted into the open ends 18, 118 of modules 12, 112. In FIG. 3 (and also in FIGS. 4 and 4A discussed below), the elements that are different in alternative module configuration of module 112 have different identification numerals, the remaining elements which are essentially identical to those shown in FIGS. 1 and 2 having the same numerals. In module 112 of FIG. 3, the elements are in most respects identical to the embodiment of FIGS. 1 and 2, so when identical elements to those of FIGS. 1 and 2 are illustrated, identical numeral will indicate those elements in the FIG. 3 embodiment, and similar elements providing identical functions are indicated by having a prefix (1, 2, 3 etc.) before the last two digits in the numeral.

The left module 112 is slightly different from module 12 (FIG. 1) in that it also functions as a cabinet 119, whereby the post 116 includes one or more hinges 111, which are attached to the post 116 and to a cabinet door 117. The hinges 111 permit the cabinet door 117 to swing out and when closed, to engage the opposite post (not shown in FIG. 3) of that module 112. Ideally, the door 117 will fit within the rectangular or square opening between posts 116 and horizontal struts 136 of module 112, thereby presenting a common surface in front of the cabinet 119. If the space defined by module 112 is desired to be totally enclosed and to function as a separated cabinet 119, additional walls (not shown in FIG. 3) may be disposed between front and back posts 116 of module 112 to enclose the space within.

Referring again to FIG. 3, and also to FIGS. 6 and 12, 12A showing the connector insert 40 as a separate element, the connection insert 40 is shown in perspective views from different angles. The longitudinal direction of the connection insert 40 is in the vertical direction when it is inserted into vertically oriented open end 118 of module 112, as shown. It has four walls or sides, two opposing straight or planar walls 48, joined at the edges by a third planar wall 46 and an open side 44 in which a groove or channel 40 is provided for insertion of one head of the double headed nut 60. Threaded screwholes 30 (FIG. 6) are disposed on the third planar wall 46 and configured and oriented to receive screw or bolt connectors 32 (FIGS. 12, 12A) to connect the connector insert to the posts 16, 116. As shown in FIG. 6, the walls 46 and 48 may be joined by a bend 47 that defines a curved corner and a second curved corner 45 may join the walls 44 and 48. Alternatively, shown in FIG. 3, the corner is a sharp corner, the exact shape not being critical to the invention.

Figure 4:
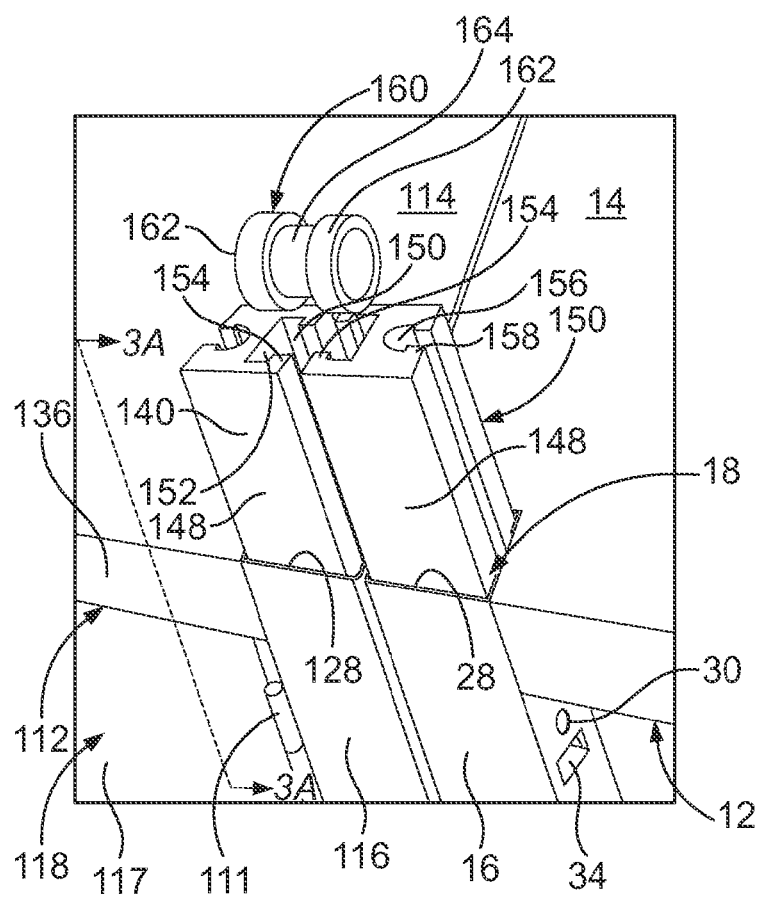
FIG. 4 is a perspective detail view of a corner of the second embodiment of the invention showing the insert connector of FIG. 1 between two adjacent shelf modules.

Referring now to FIG. 4 and to the cross-sectional view of FIG. 4A, a second embodiment of the invention having two different types of modules 12, 112 is shown. With the exception of alternate connector inserts 140, shown inserted each into an open ends 18, 118 of posts 16, 116, respectively, the configuration is essentially identical to that shown in FIG. 3.

The alternate connector insert 150 has a different construction to that of insert 40 (FIGS. 1, 6), in that it has two longitudinal channels 152, 156 extending from one end to the other of the connection insert. The size or cross-sectional area of each insert 150 is slightly less than the open ends 18, 118 so that the insert 150 can easily slide into the open ends 18, 118 of the tubular channel formed by the walls of posts 16, 116 respectively. Referring now also to the cross-sectional view of FIG. 4A, there is shown a slight clearance to avoid frictional binding of the inserts 150 when inserted into the open ends 18, 118. Sides 148, which are planar without any breaks, are adjacent the straight opposing edges 28, 128 of the open ends 18, 118. Each connector insert 150 includes a pair of slots or channels 152, 156 that extend along its longitudinal length. Each channel 152, 156 has a different function, the slot 152 having dimensions, and being further defined by two overhanging cantilevered lips 154 which together provide physical retention to the head 52 of the double headed dowel 50. That is, when the cylindrical head 162 of double headed dowel 160 is longitudinally inserted into a slot 152, the outer ends of the head 162 engage the lip and retain it within the slot or channels 152.

A double headed dowel 160, having the two heads 162 connected to each other by a dowel pin 164, is inserted into the slots 152 of two adjoining connector inserts 150, which inserts 140 are themselves inserted into the open ends 18, 118 of two adjoining modules 12, 112. The dimensions of the double headed dowel 160 and the slot 152 correspond such that when all elements are fully inserted, the double headed dowel 160 retains the parts, especially the two inserts 150, are kept in place by frictional and close tolerance mechanisms. That is, because the heads 162 are firmly retained within the channels formed by slots 152, and the dowel pin 164 is firmly positioned in place within the inserts 150, and posts 16, 116, there is a robust and sturdy connection of the parts which does not permit any freedom of motion of the modules 12, 112 in the horizontal direction relative to each other.

Of particular significance is the diameter dimension of the central cylindrical dowel pin 164 which connects the two heads 162 to each other. The diameter of the dowel pin 164 is predetermined to match the diameter of the cutout 26. In this way, the dowel 160 retains the horizontal configuration of the modules 12, 112 so that no translation or motion can occur in the lateral direction. A slight frictional engagement between the dowel pin 164 and the edges of the cutout 26 may provide for a frictional engagement that retains the connection secure.

The second slot or channel 156 has appropriate dimensions to receive a nut 135 (FIG. 4A) into which the threads 131 of bolt 132 engage to secure the vertical positioning of each insert 150 within open ends 18 defined by the walls of the separate posts 16, 116, respectively. Channel 156 is defined by two cantilevered lips 158 or protrusions that extend the length of the connector insert 150 as best seen in FIG. 4A. The vertical position of the inserts 150 is constrained by the tabs 34 that are bent out of the plane of the wall comprising the post 16, 116. That is, the tab 34 is cut into the wall along three edges and then the tab 34 is bent into the tubular channel defined within the posts 16, 116. These tabs 34 are disposed so that the surface closest to the open or closed ends 18, 20, respectively, are dimensioned to provide a length from the lip 28, 128 to the tab surface as precisely matching one-half the longitudinal dimension of the insert 150. In this way, the placement of a second row of modules 212 above the first module 112, with the open end 218 of the posts 216 being slid over insert 150 cause the corresponding tab 34 of the top module post 216 to contact the end of the insert 150 as shown in FIG. 4A. Thus, the two tabs 34 precisely position the inserts 150 within the channel defined by tubular posts 16, 116, 216, and thereby constrain the movement of the inserts, so as to provide the precise positioning for the threads 131 of bolt 132 engaging the nut 135.

Referring now to FIGS. 4, 4A and 5, another vertically aligned module 212 is placed over the connection inserts 150 to provide a second level or row of modules 212, etc. above the first set of modules 112, 12. For providing a sturdy connection between two vertically adjacent modules, such as modules 112, 212 having a vertical orientation relative to each other as illustrated in FIG. 5, the post 216 of the top row module 212 is slid over the insert 150 and is firmly depressed in the direction of Arrow A until the cutaway 26 (FIG. 4, not visible in FIG. 5) engages the dowel pin 164. The cutaway 26 of the top module 212 has been depressed to the level of the dowel pin 164, and so the two cutaways 26, that is, the two cutaways 26 of the top In this respect, the two modules 112, 212 engage each other so that the lower horizontal strut 236 of the module 212 comes into contact with the upper horizontal strut 138 of module 112, as is shown in the cross-sectional view of FIG. 4A. Simultaneously with the engagement of the cutaway 26 with dowel pin 164, tab 34 of the top module 212 will engage the end or top surface of the connection insert 150, as shown in FIG. 4A.

Similarly to the description above of the insert 150 embodiment, in the insert 50 embodiment shown in FIGS. 2, 3 and 6, the tabs 34 position the inserts 50 so that the threaded screwhole 52 align with the screwholes 30 which are disposed exactly adjacent when the posts are depressed into their contacting position. As the alignment is reached, the threaded hole 52 provides engagement to and fixes the position vertical position of the inserts 50, or alternatively inserts 150, and when both inserts 150 of top module 212 and lower module 112 are thus attached, the modules are connected to each other and cannot be moved in the vertical direction without first disengaging the either the screws 32 (FIGS. 12, 12A) from the screwholes 52, alternatively, disengaging threaded bolts 132 from corresponding nuts 135 (FIG. 4A). Thus, the combination of the inserts 150, 50 and threaded connections retain the vertical disposition of the modules 112, 212, etc., and the dowel 60, 160 will retain the horizontal position of adjacent modules, 112, 12, etc.

Figure 11:
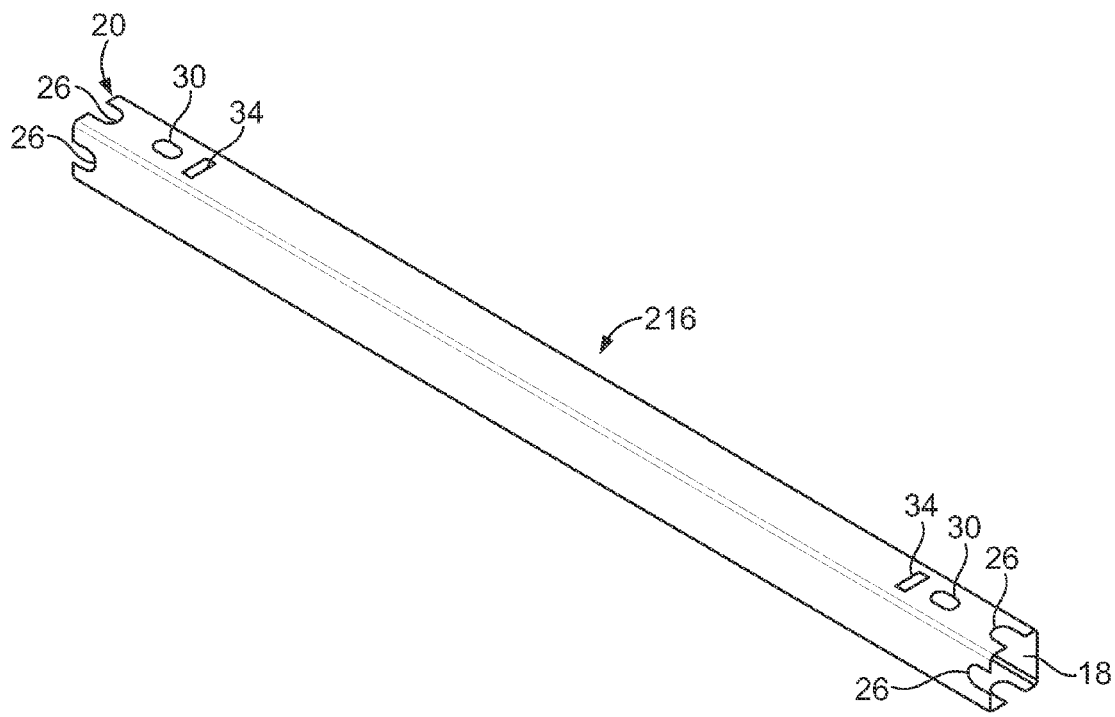
FIG. 11 is a perspective view of a first embodiment of the support channel.

Referring now to FIG. 11, there is shown an alternative embodiment of a post 216, which is partially shown in FIG. 5, and which may be used in a configuration in which the appearance of the front of the modules is not a significant consideration. Posts 216 are essentially identical to posts 16 (FIGS. 1 and 2) including one opposed pair of walls having the cutouts 26, throughholes 30 and tabs 34. One significant exception is that that the open end 18 and closed end 20 each include cutouts 26 in all four sidewalls as shown in FIG. 11. This embodiment is like all the parts that are separately described and illustrated herein, are interchangeable with other similar parts, so that it is possible to configure the final storage and workspace as desired by the user. Additionally, if changes thereto are desired, the configuration can be easily altered and reconfigured to the desired configuration.

Figure 8:
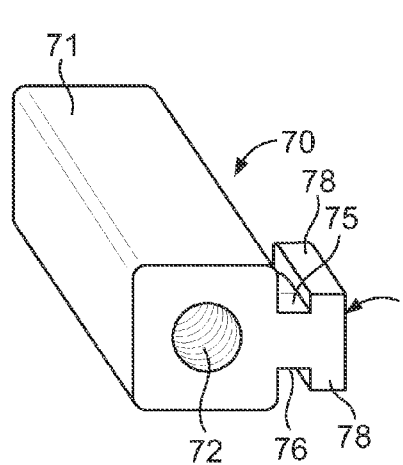
FIGS. 8 and 9 are a perspective views of the end connector insert from different angles.
Figure 9:
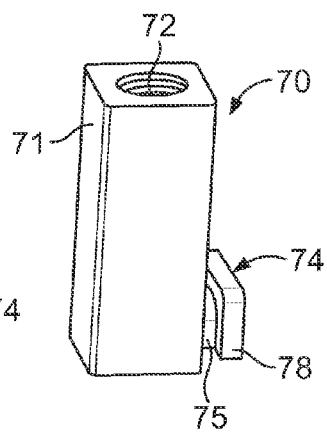
Figure 10:
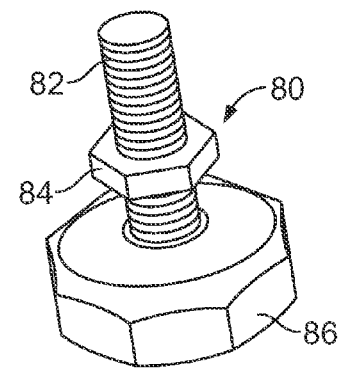
FIG. 10 is a perspective view of a floor coaster.

With reference to any of the embodiments, but most particularly to those shown in FIGS. 1, 8, 9, 10, 12, 14, 15 and 16, the closed ends 20 will be discussed in greater detail and the manner in which the closure members, comprising the end connector inserts 70 and casters 80 provide for a footing or caster connection to achieve a horizontal stability to the configuration. As shown in FIG. 1 and the partially exploded view of FIG. 14, the end connector inserts 70 are approximately half the length of the inserts 50, 150. They may be solid metal parts as shown in FIGS. 8 and 9, having a threaded throughhole 72 extending centrally through the length of the longitudinal dimension of the body portion 71 of end connector. The throughhole 72 has threads that provide for receiving the threaded portion 82 of casters 80.

One significant difference of the end connectors 70 relative to inserts 50, 150 is a hook extension that extends adjacent an end 73 of the end connector 70. This hook extension provides the retaining function of the dowel 60, and comprises a head portion 74 that can engage the ends 18, 20 of the posts 16, 116, and a linking portion 76 that has a rounded surface 75 that itself engages the cutout 26 adjacent ends 18, 20 of the posts. Adjacent the rounded surface is a threaded throughhole, (not shown), which provides the function of threaded hole 52 for receiving the screw 32. After the end connector insert 70 is in place within the tubular end 20, the screw is inserted through throughhole 30 and is screwed into the threaded hole (not shown) of the end connector insert 70, to lock it into place. The length of the body portion 71 is of a length to engage the tab 34 but because it is closing the end 20, the bottom surface of the body 71 does not extend below the lower rims of the posts 16, 116 etc. Thus, all the parts discussed above only extend up to a plane defined by lower horizontal struts 36.

Figure 14:
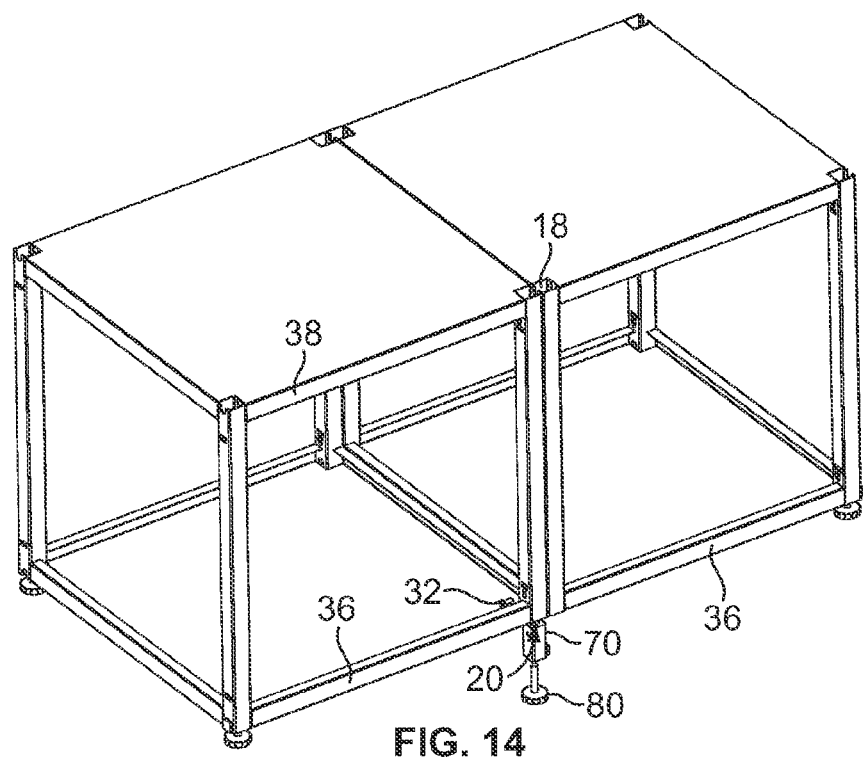
FIG. 14 illustrates two horizontally adjacent shelf modules and the inserts and casters for deploying the configuration on a floor.
Figure 15:
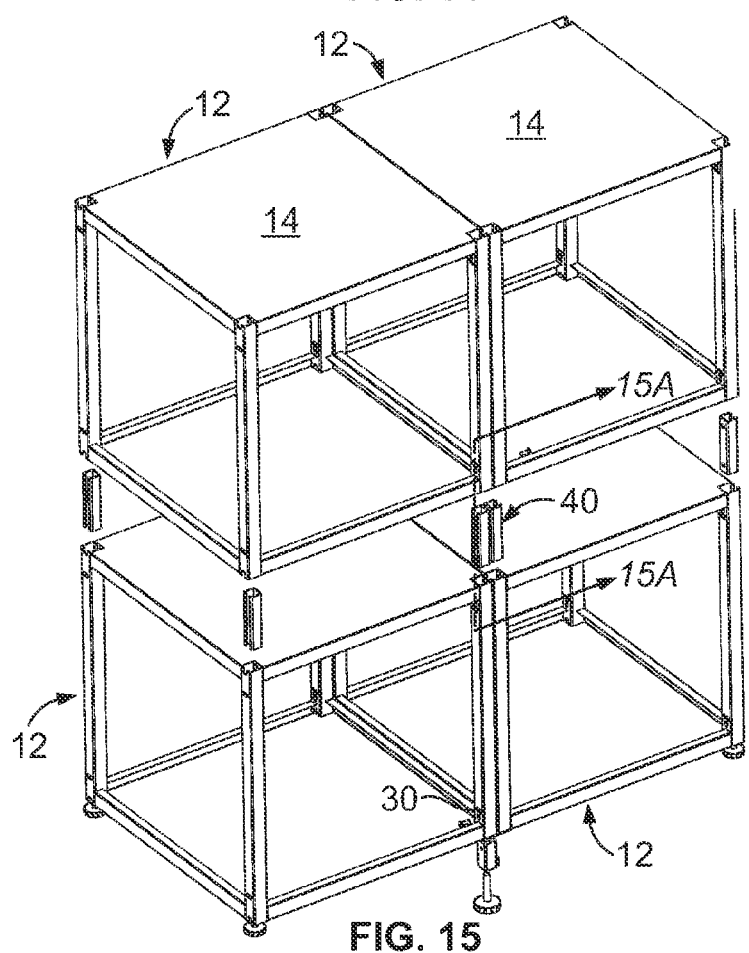
FIG. 15 illustrates a configuration of two horizontally adjacent shelf modules and the inserts and casters for deploying the configuration on a floor and two vertically adjacent shelf modules over the two horizontally adjacent shelf modules.

One significant feature that provides for an integral configuration is that the longitudinal body portion 71 of the end insert 70 is inserted into one end 20 of a tubular post 16 while the extension 70 engages the cutout 26 of an adjacent post (e.g., 116) which then connects the two parts in a sturdy and robust connection. As shown in FIGS. 14, 15. If the module is the last one in the row, as shown in FIGS. 14, 15, then it simply is inserted into the end 20 with the extension 70 not engaging any other element. In either position, the lower edge of the end connector insert 70 is disposed so that it is flush with bottom surface of each lower horizontal strut 36. Once the insert is in place, the screw is then screwed in and the position of the end connector insert 70 is in locked mode and cannot be removed without unscrewing the screw 32.

To provide of the caster configuration utilizing the caster 80 (FIG. 10), the threaded end 82 of the caster 80 is screwed into the threaded hole 72 of the end connector insert 70, until the threaded adjuster nut 84 is engaged by the bottom surface of the body 71 of the insert 70. The floor head 86 of the caster 80 has an adjustable height to provide for leveling of the modules relative to the floor on which they are disposed, the height being adjusted by turning the adjuster nut 84 to that appropriate level as in a conventional adjustable caster.

Figure 13:
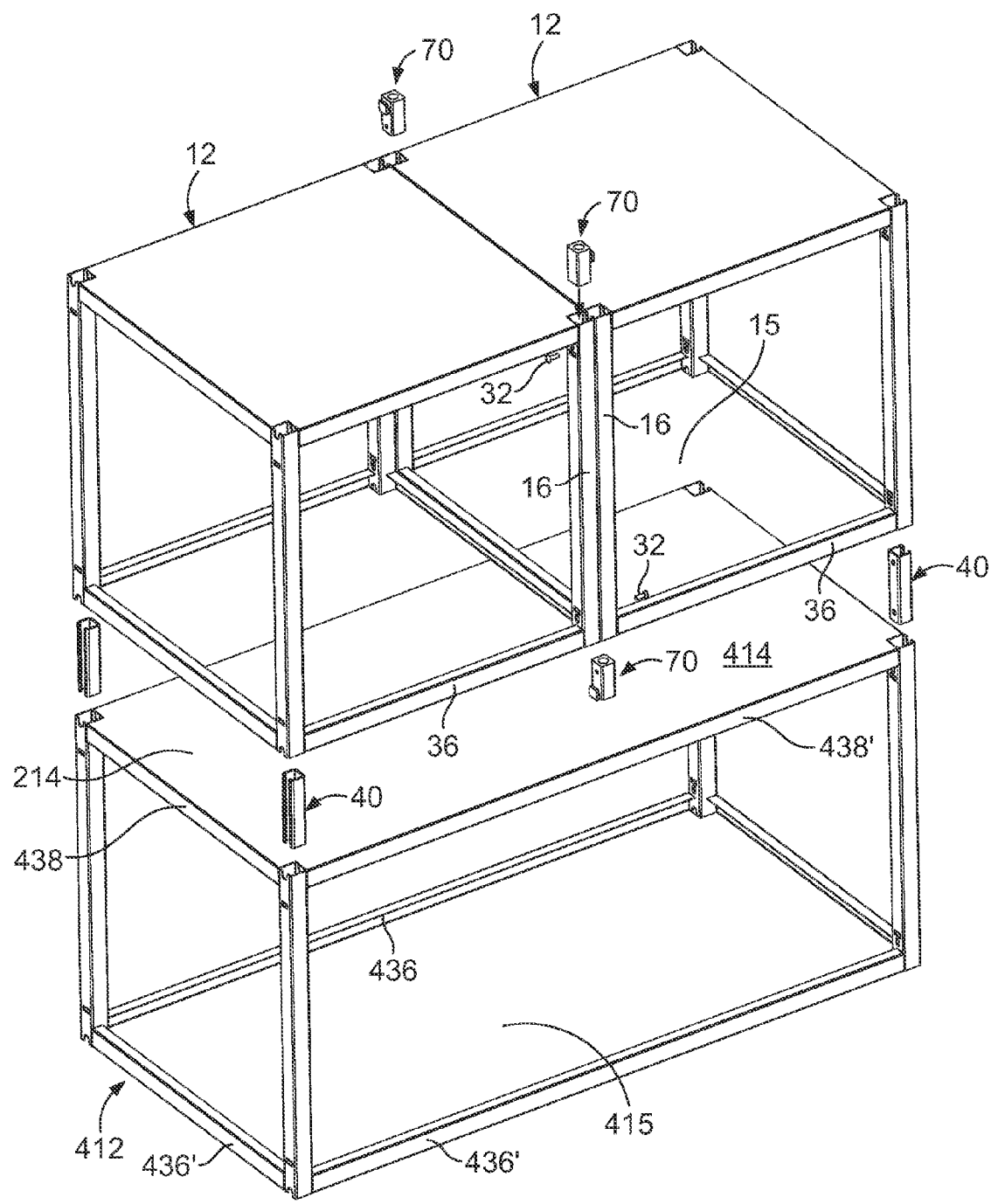
FIG. 13 illustrates in a perspective view of several adjacent shelf modules attached to each other and the insertion of different connector inserts to attach a spanning third module.

The end connector insert 70 also is utilized in other areas, as is shown in FIG. 13. The configuration of the embodiment shown in FIG. 13 includes an extended module 412 in a first lower row, and two modules 12 as shown in FIG. 1 which comprise a second, upper row. All the elements are identical to the two modules 12 of FIG. 1 with the exception that no casters 80 are disposed at the lower end, and full connection inserts 50 are utilized to join the lateral corners of the top modules 12 to the bottom module 412. For simplicity, the surfaces 14 and 414 have been included, but the lower surfaces for each module have been omitted, leaving spaces 15, 415 between the lower horizontal struts 36, 436, and coasters 80 (FIG. 1) are not shown.

The bottom row module 412 has a length of twice the size of the modules 12, other wise being in most respects identical. The surface 414 has double the area and the length of the longitudinal upper and lower horizontal struts 438', 436' are twice the length of the lateral upper and lower horizontal struts 438, 436. The lower horizontal struts 36 of the upper two modules 12 are adjoining and contact the upper strut 438'. At each of the upper corners of the lower row module 412, a connection insert 40 connects the top modules 12 to corresponding lower corners thereof. Since the top surface 414 of the module 412 provides the shelf support surface, a corresponding lower surface (such as lower surface 14'-FIG. 12) is redundant and omitted. However, to make the connections robust enough to enable the top surfaces 14 of the modules 12 to be used as a work surface, connections of the two lower and upper ends of the posts 16 are effected by two end connector inserts 70 at opposite ends of the lateral extending edges f surfaces 14, as shown. To strengthen the connection between the upper row modules 12, the end connector inserts 70 are oppositely oriented, one each being inserted into a post 16 of a different module 12, the head 74 of each end connector inserts 70 connecting to the post 16 of the other module 12.

Alternative but similar configurations are shown in FIGS. 14 and 15, the configuration in FIG. 14 having been described above, and having the casters 80 to provide a level surface for supporting eth modules 12. In FIG. 15, the configuration is four separate modules 12 being disposed in two rows of two modules 12 each, the connections between the modules at the corners being completed by the connection inserts 40, as shown in the cross-sectional view of FIG. 15A, and described above. Optional connections made by plural end connector inserts 70 (as in the FIG. 13 embodiment), or the open ends 18 can simply be covered by plural stoppers 90, 90'(FIG. 16).

The details of the stoppers 90, 90' will be discussed below with specific reference to FIGS. 7 and 16. Stopper 90 comprises a body 94, having rubberized or plastic ribs 95 for engaging the inside of the walls of the posts 16, and a top closure cap member 92 for sealing the open end 18 having an under surface that will engage and contact the surface 14 of the topmost module 12. When the desired configuration is built, the closure member 90 is inserted into the open end 18 and depressed until the undersurface 96 engages the top surface 14. The ribs 95 create a frictional fit that retains stopper 90 in place.

Figure 16:
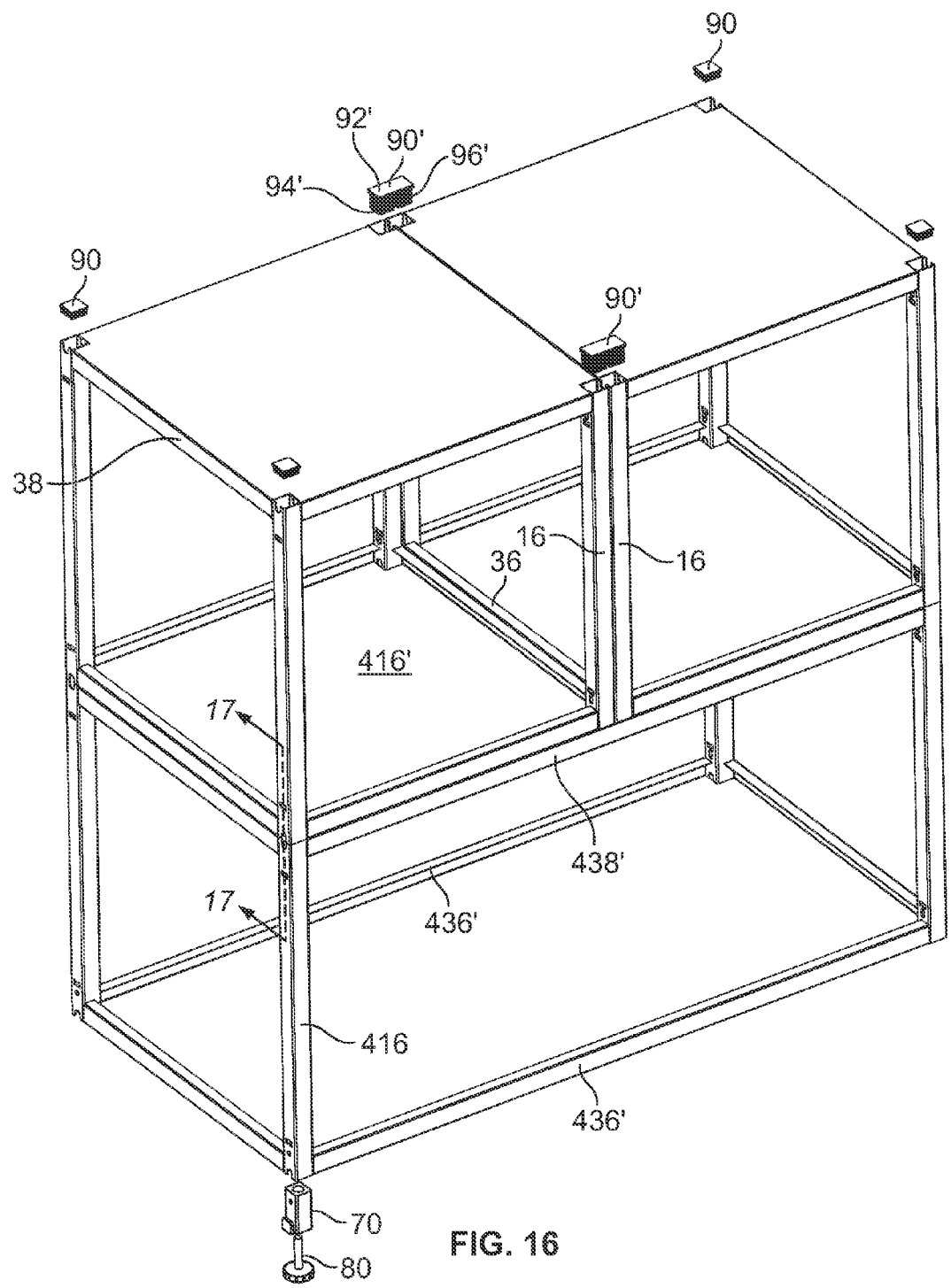
FIG. 16 is a perspective view of several shelf modules showing the end connector and top stopper for completing a work surface and the floor.

The stopper 90 is intended mostly to cover the open end 18 at the top of a stack of modules, as shown in FIG. 16. The configuration in FIG. 16 essentially illustrates the configuration of FIG. 13 which has been completely assembled but for the stoppers 90, 90' which are shown as being in a partially exploded state. Instead of an end connection insert 70 (as shown in FIG. 13), however, a double stopper 90' is shown joining and connecting adjacent posts 16 from horizontally adjacent modules 12 in a top row of a stack. The double stopper 90' is a dual body 94 structure that has a single top closure cap member 92' connecting the two bodies 94. Moreover, as shown in FIG. 16, the two bodies are separated by a distance that precisely matches the desired distance between two open ends 18 of adjacent posts 16, so that when the double bodied stopper 90' is has each one of the bodies 94' inserted into the open ends of adjacent posts 16, the top closure member 92' locks the horizontal position of the posts 16 relative to each other in a closely adjoining arrangement. The FIG. 16 embodiment also shows at the lower corner of the lower module 412 the partially exploded end connector insert 70 with the caster 80 ready to be screwed into place in the bottom closed end 420 of the post 416 to provide an example of a floor engagement to the configuration.

Figure 15A:
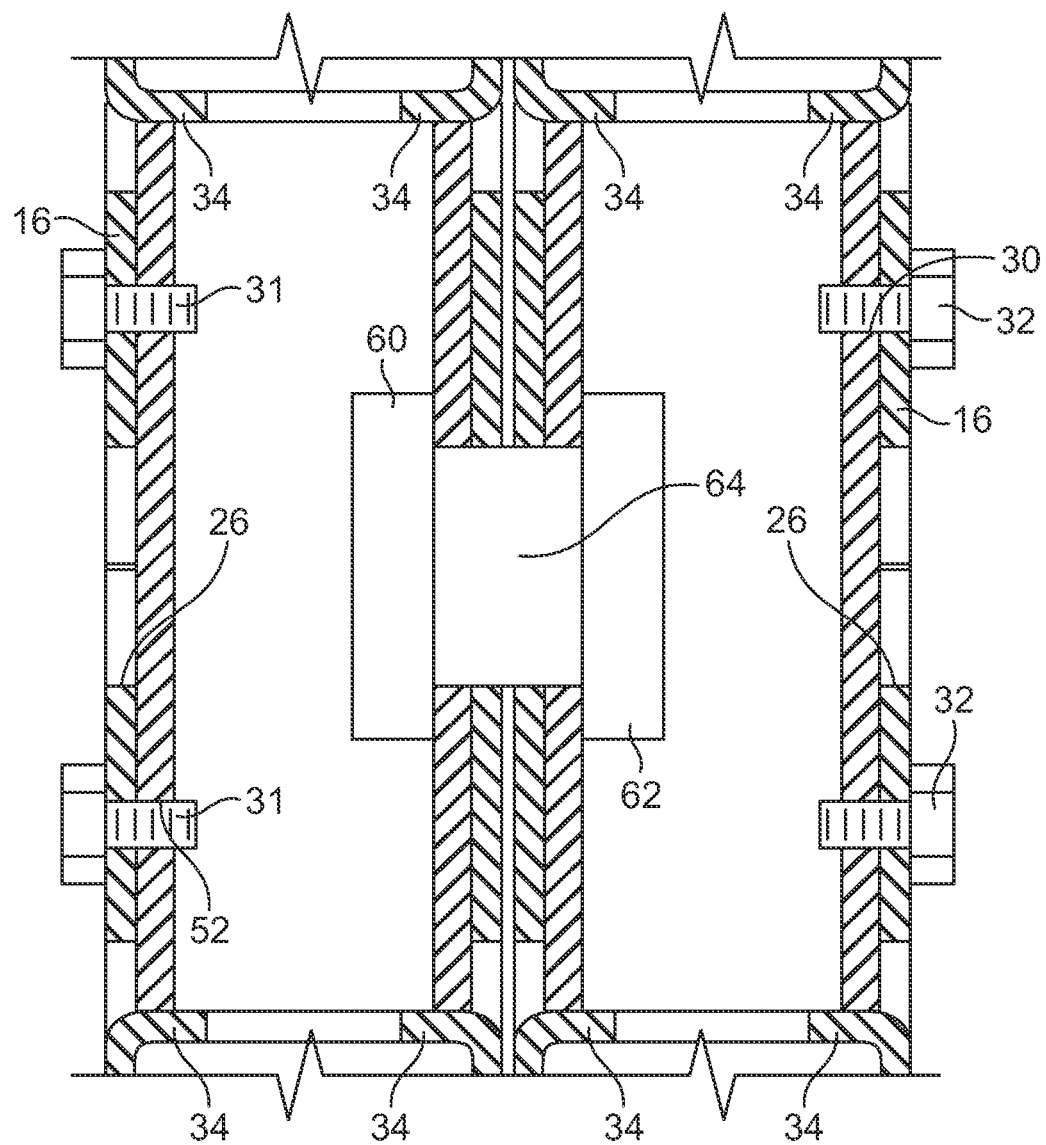
FIG. 15A is cross-sectional view of the first embodiment connector insert showing the attachment of two horizontally adjacent shelf modules.
Figure 17:
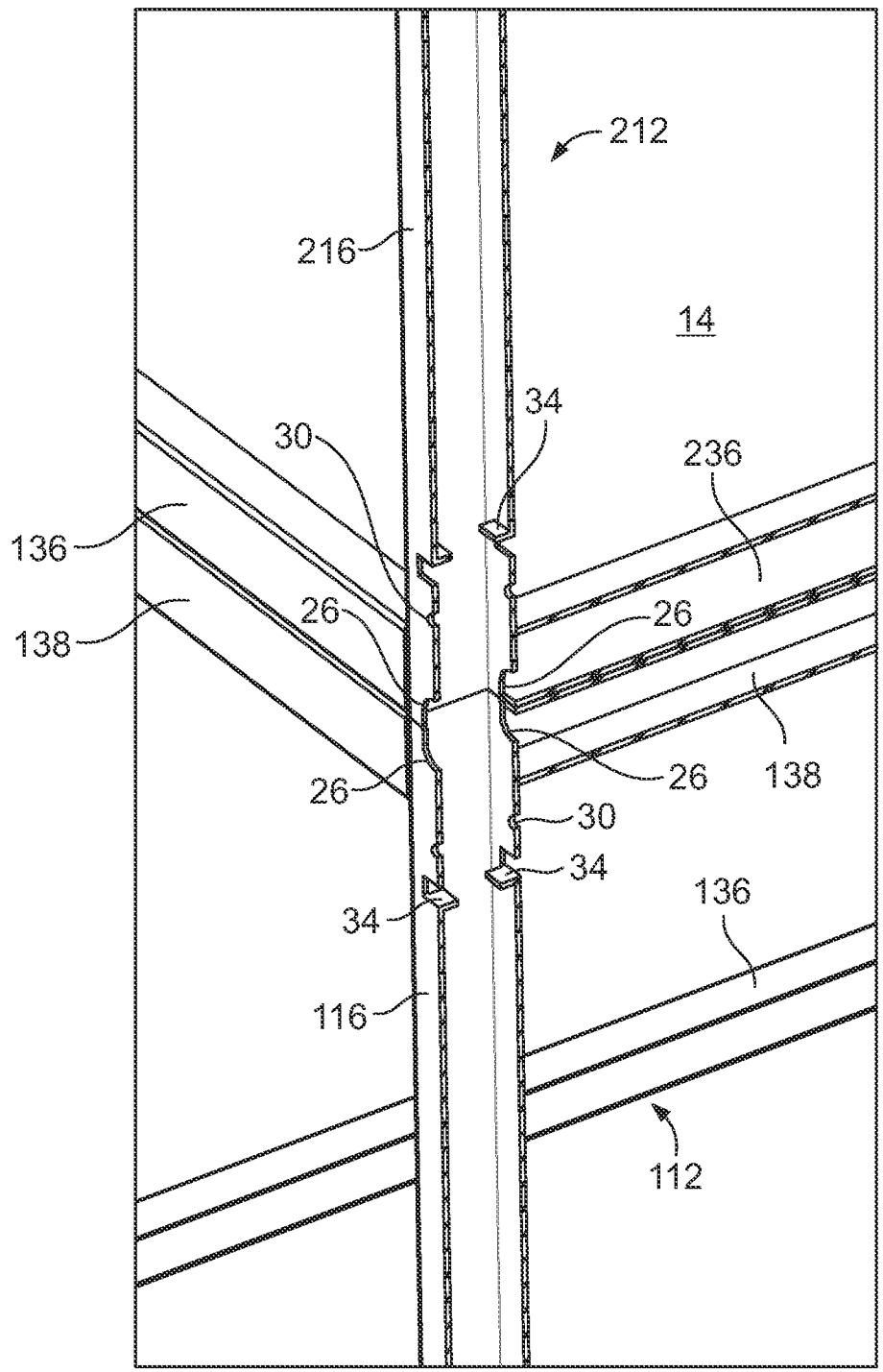
FIG. 17 is cross-sectional view of the side supports of the modules showing the internal channel for receiving the inserts.

Referring now to the cross-sectional view of FIG. 17, taken approximately along the line 17-17 in FIG. 16, the post 116 of the bottom row module 112 and the top row post 216 of an upper row module 212 aligned vertically, with the cutouts 26 being in place to define a circular retention cutout for essentially surrounds a dowel pin 64 (FIGS. 4A, 15A). As described above, the tabs 34 extend into the tubular posts 116, 216 to provide a stop for further insertion of the connector inserts 50, 70 and 150. Similarly, for the top module 212, the tabs 34 constrain the inserts 50, 70, 150 from moving any further than to en able alignment of the throughhole 30 and the threaded hole 52 (FIGS. 4A, 15A). The close proximity, indeed contact, between the adjacent surfaces of the upper horizontal strut 138 and the lower horizontal strut 238 is clearly evident in this cross-sectional view.

Figure 18:
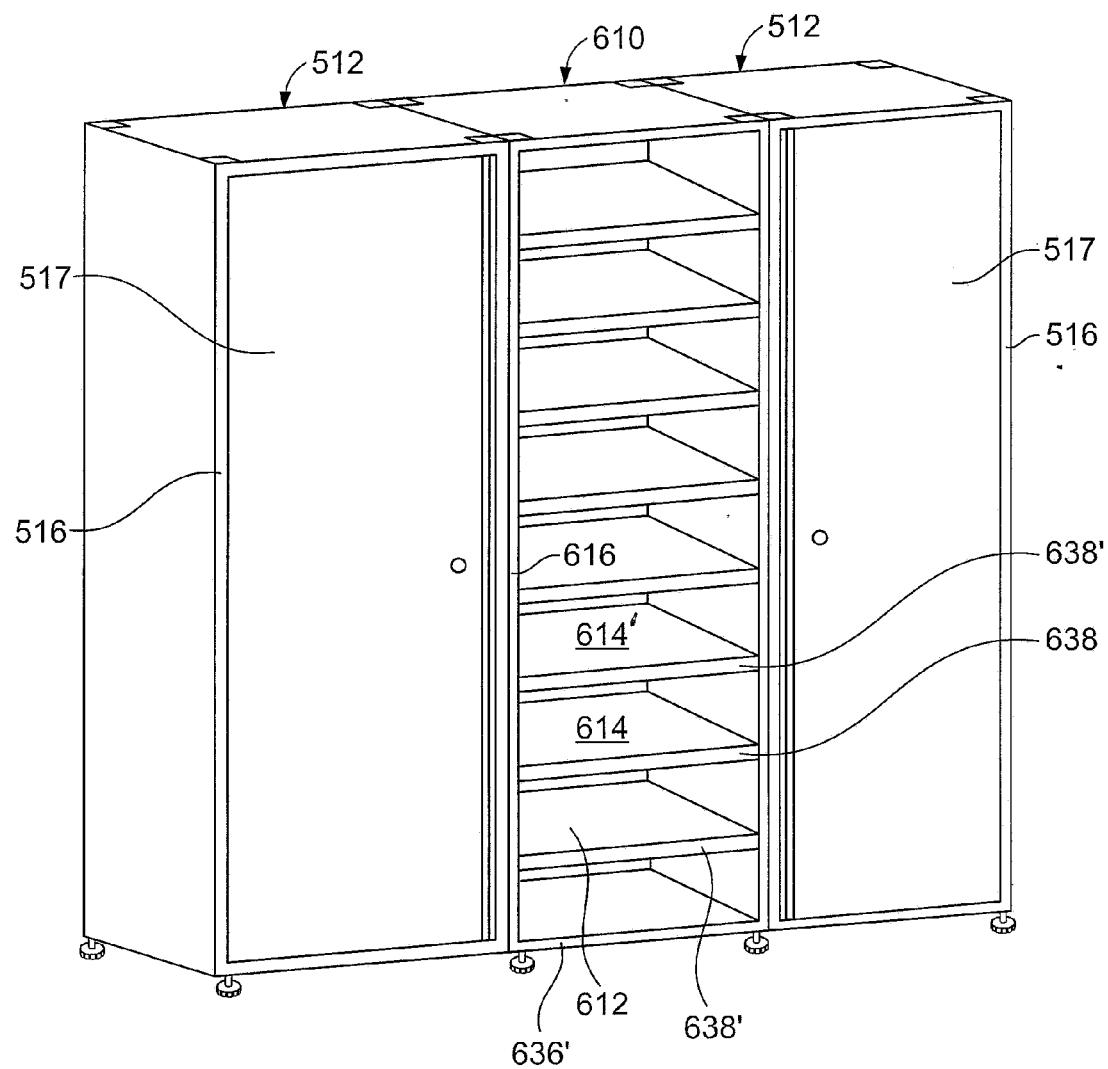
FIG. 18 is an elevational view of several shelf modules in an alternative embodiment configuration.
Figure 19:
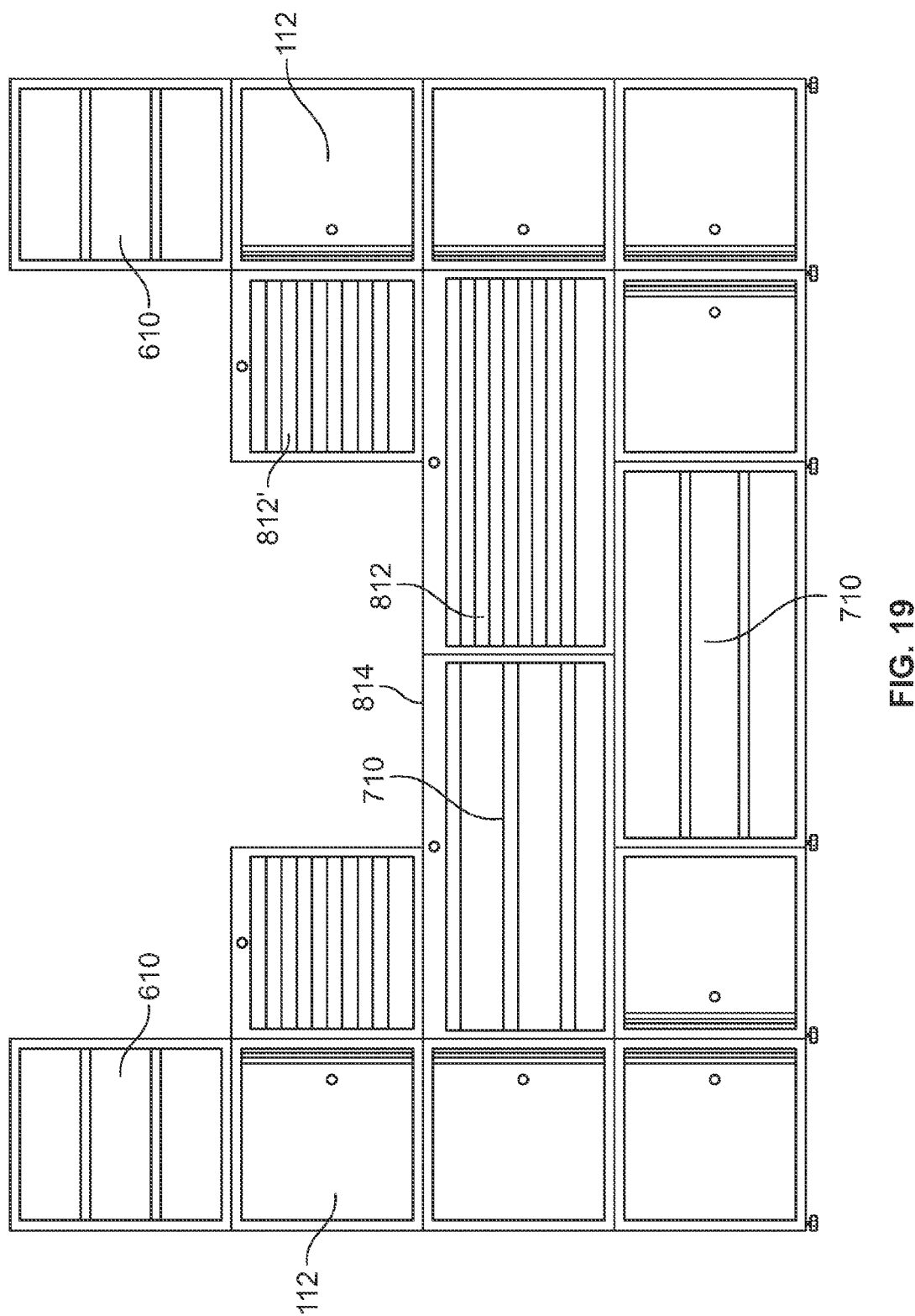
FIG. 19 is an elevational view of several shelf modules and cabinets in yet another alternative embodiment configuration.

Referring now to FIGS. 18 and 19, the variety of modules and the capability to customize the configurations that may be utilized is illustrated. Similarly to the horizontally oriented struts 436'(FIG. 16), the configuration perspective view in FIG. 18 shows the posts 516 to be much longer than the posts 16, 116, etc., to provide for a much longer vertical module 512. Two modules 512 are disposed on either side of a shelf stack 610.

Shelf stack 610 includes a greater number of shelf modules 612, similar to the modules 12, 112 etc., but with only about half of the shelf height for each shelf storage space. The shelf size can be made to order and appropriately sized posts 616 can be provided with the connections as shown in relation to the previous modules. Alternatively, the shelf posts 616 can be modified to include a speared connection position for connecting intermediate shelves 638' having storage surface 614'. These can be indents (not shown) on the posts 616 in which supports for the shelves 638' can be disposed. In addition, modified cabinets 517 extending from the floor up to the top of the configuration may be included within the modules 610. Also, these modules 512, 610, indeed any of the modules described herein, can be prefabricated and sent to the customer as completed modules requiring only appropriate configuration and attachment to each other as described above.

Referring now to the elevational view of FIG. 19, an elaborate configuration embodiment is therein illustrated showing different types of modules 710, having shortened shelf height, but double longitudinal horizontal dimensions disposed in the configuration. Other types of modules include the cabinet modules 112 (FIG. 4), the shortened shelf height modules 612 (FIG. 18), the modules 812 and 812' having vertically moveable covers 817 that can be inserted within the storage cabinet 818 by a tilting action, or by a rolling action similar to those that are present in roll top desks.

The common of the configurations of modules, and of any of the modules described herein, is the ability to connect the modules to each other so that they remain stable with a robust connection that will not release even if there is virulent actions taken, for example on the work surfaces 14, 214 etc. That is, the work surface 814 may be utilized as a work surface to use in a robust manner, and may be even strong enough to attaché other types of tools thereon, for example a vise, or a jig, on which appropriate work can be performed without disturbing the connections between the modules.

The invention herein has been described and illustrated with reference to the embodiments of FIGS. 1-19, but it should be understood that the features and operation of the invention as described is susceptible to modification or alteration without departing significantly from the spirit of the invention as disclosed above. For example, the dimensions, size and shape of the various elements may be altered to fit specific applications. Accordingly, the specific embodiments illustrated and described herein are for illustrative purposes only and the invention is not limited except by the following claims.

What is claimed is:

1. A modular storage system comprising:
   a) a plurality of modular storage units each comprising opposing lateral sides providing for a horizontally oriented length therebetween, the modular storage units each extending between plural hollow elongate support members;
   b) the plural hollow elongate support members having longitudinal ends, each of the longitudinal ends including apertures defined by an outer rim disposed thereat, each of the longitudinal end apertures further comprising an internal space extending into the hollow elongate supports, the outer rim of each elongate end having at least one indentation cutout for receiving a double-headed dowel, a predetermined series of the plural hollow elongate support members defining a storage module;
   a plurality of double-headed dowels having a central dowel pin shaped and configured to fit within the cutout disposed at the outer rim of the longitudinal end apertures so as to enable connection in a horizontal orientation of adjacent elongate support members from different storage modules, and two heads disposed at opposite longitudinal ends of the plural dowel pins the lateral dimensions of the heads being larger than the lateral dimensions of the dowel pins; and
   a plurality of vertical connection members shaped, dimensioned and configured for at least partial insertion into the longitudinal end aperture of at least one vertically oriented hollow elongate support member so as to maintain the orientation and configuration of support members in two adjacent different modules having vertical alignment; each said vertical connection member including a securing member to secure the vertical connection member to the hollow elongate support members.

2. The modular storage system according to claim 1 wherein the modular storage units further comprise shelves.

3. The modular storage system according to claim 1 wherein the modular storage units further comprise enclosed drawer units.

4. The modular storage system according to claim 1 wherein the modular storage units further comprise enclosed cabinets.

5. The modular storage system according to claim 1 wherein the vertical connection members further comprise a threaded screw for insertion into a wall of the hollow elongate support members and the vertical connection members further include a corresponding threaded aperture for receiving the threaded screw to thereby secure the vertical connection members to the hollow elongate support members.

6. The modular storage system according to claim 1 wherein the hollow elongate support members further comprise tab that is inwardly extending into the hollow tubular elongate support member shaped, dimensioned and oriented to restrain further motion of the vertical connection members into the tubular member.

7. The modular storage system according to claim 1 wherein the plurality of vertical connection members further comprise at least one longitudinal groove along its length providing for a U-shaped channel within which a connecting fastener can slide in the longitudinal direction.

8. The modular storage system according to claim 7 wherein the U-shaped channel within the vertical connection member is shaped, dimensioned and oriented for connecting a first end of the fastener to slide in the longitudinal direction and having a connection at a second end to interface with the floor which supports the storage system.

9. The modular storage system according to claim 1 wherein the plurality of vertical connection members further comprise at least one longitudinal channel along its length providing for a U-shaped channel having an opening, the channel providing sufficient room within the vertical connection member in which the double headed dowel can slide in the longitudinal direction, the opening between the two ends of the U-shaped channel being wide enough to receive the dowel pin, and the channel being shaped, dimensioned and oriented to receive a head of the dowel.

* * * * *